United States Patent [19]

Deguevara

[11] Patent Number: 5,372,287

[45] Date of Patent: Dec. 13, 1994

[54] ARTICLE CARRIER

[76] Inventor: Orlando Deguevara, 211 W. Garfield Ave., Glendale, Calif. 91201

[21] Appl. No.: 192,733

[22] Filed: Feb. 7, 1994

Related U.S. Application Data

[63] Continuation of Ser. No. 956,168, Oct. 5, 1992, abandoned.

[51] Int. Cl.$^5$ .............................................. B60R 9/08
[52] U.S. Cl. ........................ 224/42.03 B; 224/309; 224/320; 224/42.45 R; 224/42.42; 224/42.44; 403/355; 248/354.4; 248/354.5
[58] Field of Search ............... 224/42.03 R, 42.03 B, 224/42.45 R, 42.42, 42.4, 42.28, 42.29, 42.24, 42.45, 42.14, 42.13, 309, 320–323, 354.4, 354.5; 280/186, 495, 500, 502, 504, 507; 453/299, 343, 362, 356, 355, 358, 373, 395, 407.1; 411/411, 424, 378, 81, 166, 190, 399–401, 426, 309

[56] References Cited

U.S. PATENT DOCUMENTS

| 1,779,192 | 10/1930 | Signer | 280/495 |
|---|---|---|---|
| 4,411,461 | 10/1983 | Rosenberg | 224/42.03 B |
| 4,676,414 | 6/1987 | Deguevara | 224/42.03 B |
| 4,865,686 | 8/1989 | Workentine | 224/42.07 |
| 5,004,133 | 4/1991 | Wyers | 224/42.45 R |
| 5,067,641 | 11/1991 | Johnson et al. | 224/42.03 B |
| 5,137,192 | 8/1992 | Sheridan et al. | 224/42.45 R |
| 5,181,822 | 1/1993 | Allsop et al. | 224/42.03 B |
| 5,190,195 | 3/1993 | Fullhart et al. | 224/42.03 B |

FOREIGN PATENT DOCUMENTS

2666775  3/1992  France .......................... 224/42.03 B

Primary Examiner—Ernest G. Cusick
Attorney, Agent, or Firm—J. E. Brunton

[57] ABSTRACT

An article carrier adapted to be detachably interconnected with a vehicle such as an automobile, truck or trailer. The article carrier includes a connector member adapted to be telescopically received within a tubular member affixed to the vehicle and a carrier assembly carried by the connector member. The carrier assembly includes a generally vertically extending column and one or more outwardly extending article supporting elements. A securement mechanism is carried by the carrier assembly for cooperation with the article supporting elements to secure the carried article within the carrier assemblage. A clamping mechanism is provided to securely interconnect the telescoping tubular members of the device in a manner to positively prevent movement between the members.

15 Claims, 5 Drawing Sheets

FIG. 8

ARTICLE CARRIER

BACKGROUND OF THE INVENTION

This is a continuation of co-pending application Ser. No. 07/956,168 filed Oct. 5, 1992 now abandoned.

FIELD OF THE INVENTION

The present invention relates generally to article carriers adapted to be detachable interconnected to passenger vehicles to carry various articles such as bicycles. More particularly, the invention concerns an improved article carrier which is adapted to be detachably interconnected at the rear of vehicles such as automobiles and trucks.

DISCUSSION OF THE PRIOR ART

In the past, various devices have been suggested for carrying articles such as bicycles, wheelchairs, skis and the like at either the front or the rear of passenger vehicles. Generally these prior art devices are detachably connected to the front or rear bumper of the vehicle by some type of clamping subassembly. Typically the clamping subassembly embodies mechanical fasteners, such as nuts, bolts, washers and the like and various hand tools are required to connect and disconnect the device. Such devices are often cumbersome and inconvenient to use because they require that proper tools be carried in the vehicle at all times to accomplish the interconnection of the carrier structure with the vehicle bumper. Additionally, such devices are usually easily removable by persons intending to steal either the carrier assembly itself or the carrier assembly along with the bicycle, or other article, being carried thereby.

Prior art article carriers such as bicycle carriers also exhibit other drawbacks. For example, they tend to be unstable and fragile and often require straps or other support members which generally extend forwardly from the top member of the rack to engage something on the vehicle framework, such as the forward edge of a trunk cover or the like. Such devices are often difficult to mount and frequently are limited to use with vehicles of certain structural characteristics. Additionally such devices tend to work loose with normal road vibrations thereby constituting a serious safety hazard.

One of the most successful article carriers ever devised is disclosed in U.S. Pat. No. 4,676,414 issued to the present inventor. The apparatus of the present invention constitutes an improvement of the apparatus described in U.S. Pat. No. 4,676,414. The apparatus of the present invention can be easily and safely interconnected with a spare tire mount or with standard trailer hitch of an automobile or truck and also with a hitch provided on a trailer connected to an automobile or truck. The apparatus is also quite versatile and various articles such as bicycles, wheelchairs and other velocipedes can be securely mounted thereon for safe transport. The improved apparatus of the present invention embodies novel securement and locking means which virtually eliminates the highly undesirable relative movement between the connector member of the article carrier and the square tube trailer hitch within which the connector member is telescopically received. The improved apparatus also uniquely prevents unauthorized removal of the article carrier from the vehicle trailer hitch. Additionally, the apparatus includes novel connector means which virtually eliminates vibration between the supporting structure of the article carrier and the article support subassembly.

It is an object of the present invention to provide an article carrier assembly, or rack, which can be securely attached to a standard square tube trailer hitch of the character frequently provided on vehicles such as automobiles and trucks in a manner such that vibrating movement of the rack relative to the hitch is virtually eliminated.

It is another object of the invention to provide an article carrier of the aforementioned character which can be securely locked to the trailer hitch so as to prevent unauthorized removal of the carrier rack from the vehicle.

Another object of the invention is to provide an article carrier of the character described which does not interfere with the opening of the trunk cover or lid when the article carrier is attached to the vehicle.

Still another object of the invention is to provide a carrier rack of the class described which is lightweight and durable and can be affixed to the vehicle without the need for any type of special tools.

Another object of the invention is to provide an article carrier as described in the preceding paragraphs in which the article to be carried can be firmly and safely supported on the carrier assembly, which is uniquely designed to eliminate undesirable vibrating movement. The article is secured in place by a novel anti-theft securement member which can be locked in engagement with the article being carried so as to positively prevent unauthorized removal of the article from the carrier.

Another object of the invention is to provide a carrier rack which is readily attachable to an automobile or truck for the transport of objects, devices and articles other than bicycles including articles such as wheelchairs, skis and the like.

Another object of the invention is to provide a carrier assembly which can be connected to a spare tire carrier of the character found on sports vehicles. The assembly is uniquely adjustable so that it can be used on full size sport trucks as well as on smaller sport trucks. Additionally, the assembly can be adjusted from left to right so that the article being carried can be centered to the vehicle.

Still another object of the invention is to provide a carrier assembly embodying novel telescopically joined subassemblies which is safe to use even under conditions of high vibration tending to loosen the carrier connection to the vehicle or to loosen the securement mechanism which secures the article to the article carrier.

Yet another object of the invention is to provide an article carrier as described in the foregoing paragraphs which is constructed of a minimum number of component parts, is extremely durable and easy to use while at the same time being attractive and streamlined in appearance.

The foregoing, along with other objects of the invention are achieved by an improved article carrier adapted to be detachably interconnected in a unique manner with a standard, square tube trailer hitch affixed to the frame of a vehicle. The improved article carrier comprises a connector member adapted to be telescopically received within the trailer hitch in a manner such that relative movement between the connector member and the trailer hitch is positively prevented even though substantial clearance may exist between the connector member and the hitch. An article carrier assembly which is carried by the connector member, includes a generally vertically extending column and one or more outwardly extending article support elements. The article support elements are interconnected with the vertically extending column by means of a second telescoping assembly which is uniquely designed to prevent undesired relative motion between the supporting elements and the vertically extending column.

The article carrier of the invention can also be conveniently removably attached to a spare tire carrier of the type frequently provided on sport trucks and vans. The article support elements are adjustable so that the article being carried can be centered at the rear of the vehicle.

DESCRIPTION OF A FIRST EMBODIMENT OF THE INVENTION

Referring to the drawings, and particularly to FIGS. 1 through 7, one form of the article carrier of the present invention is there illustrated. The apparatus of this form of the invention comprises a lower, elongated, tubular connecting member 12 (FIGS. 1 and 7) adapted to be removably interconnected with interconnection means for interconnecting member 12 with the vehicle. The interconnection means is here shown as a trailer hitch assembly 14 of the character frequently mounted at the rear of automobiles, pick-up trucks and the like. Hitch assembly 14 includes a tubular member 15 having a wall 15a which is generally square in cross section and defines an external surface and an internal passageway 15b. Wall 15a is here shown as being provided with a first aperture 15c of a first size and a second, oppositely disposed aperture, 15d of a second smaller size.

Figure 1:
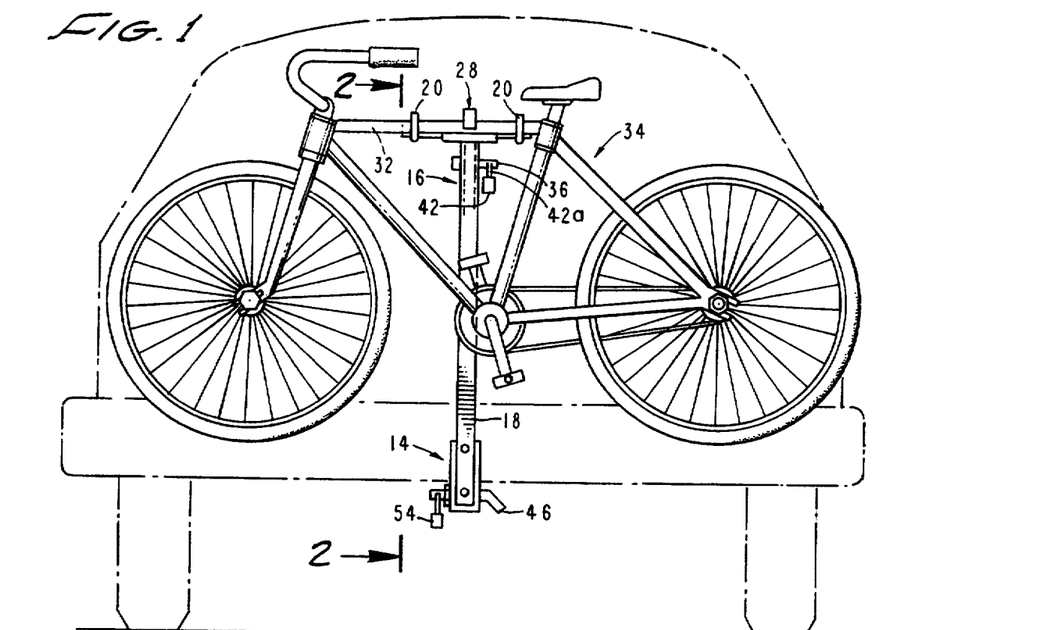
FIG. 1 is a front view of the improved article carrier shown mounted at the rear of a vehicle and removably supporting a bicycle.
Figures 2, 4, 5:
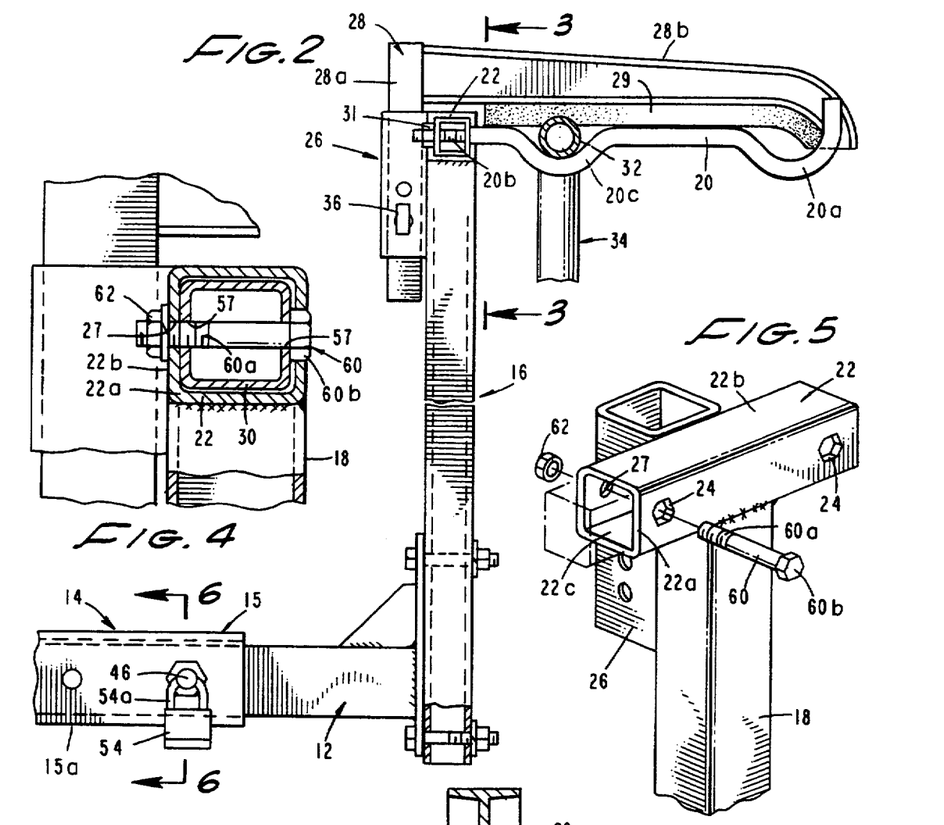
FIG. 2 is an enlarged, fragmentary view taken along lines 2—2 of FIG. 1.
FIG. 4 is a cross-sectional view taken along lines 4—4 of FIG. 3.
FIG. 5 is a fragmentary, generally perspective view of a portion of the article carrier subassembly of the apparatus of the invention.
Figure 3:
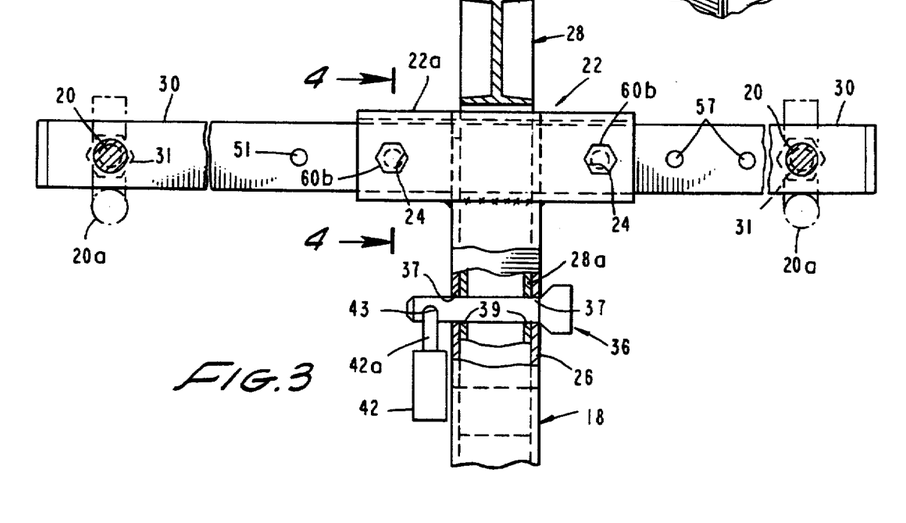
FIG. 3 is a view taken along lines 3—3 of FIG. 2 and is partly broken away to show internal construction.

Interconnected with the connecting member 12 is a carrier assemblage generally designated in FIG. 2 by the numeral 16 for carrying an article such as a bicycle, wheelchair, or other velocipede in a secure manner at the rear of the vehicle. In the embodiment of the invention shown in FIGS. 1 through 7, the carrier assemblage 16 comprises a generally vertically extending tubular column 18 and a pair of outwardly extending article supporting first elements 20 for removably supporting the article to be carried. As best seen in FIGS. 2, 3 and 5, a, transversely extending hollow stub tube 22 is connected to column 18 by any suitable means, such as welding.

Hollow tube 22 comprises a part of the article supporting means of the invention for supporting the article to be carried and includes a wall 22a which is generally rectangular in cross-section. Wall 22a defines an exterior surface 22b and an internal passageway 22c (FIG. 5). A first pair of apertures 24 of a first size and shape, namely hexagonal, is provided in wall 22a. Aligned with apertures 24 is a second pair of oppositely disposed apertures 27 of a second smaller size (FIG. 5).

Forming an important part of the present invention is securement means carried by the carrier assemblage for cooperation with the article supporting elements 20 for preventing unauthorized removal of the carried article from the carrier assemblage. This securement means here comprises first and second slidably interconnected members 26 and 28 (FIG. 2). In the form of the invention shown in FIG. 2, first member 26 of the securement means comprises a vertically extending hollow tube which is connected to vertically extending column 18 by any suitable means such as welding.

Second member 28 is generally "L" shaped, having a vertically extending member 28a which is telescopically receivable within tubular member 26 and a second outwardly extending member 28b which carries, along its lower surface a padding material 29, such as sponge rubber of the like. In a manner presently to be described, portion 28b of second member 28 is adapted to be moved into close proximity with the article being carried to prevent unauthorized removal thereof from the article carrier.

Referring particularly to FIGS. 3 and 5 of the drawings, the carrier assemblage can be seen to further comprise a generally horizontally extending member 30 which is telescopically receivable within hollow stub tube 22. Member 30 functions to carry the previously identified spaced apart article supporting elements 20 in the manner illustrated in FIGS. 2 and 3. Each of members 20 is provided with a hook-like portion 20a formed proximate the outer end thereof and includes a threaded shank portion 20b formed proximate the other extremity thereof. Threaded shank portions 20b extend through apertures provided in horizontal member 30 and are secured in place by means of threaded nuts 31. Provided intermediate the ends of the article supporting first elements 20 are concave indentations 20c (FIG. 2) adapted to receive a frame member, such as a cross bar, 32 of a bicycle 34 which, in the form of the invention illustrated in FIGS. 1 and 2, comprises the carried article. It is to be understood that the article supporting first element could also be used to removably support frame members of other velocipedes such as wheelchairs, motorscooters or the like.

Forming another important feature of the present invention is a first locking means for maintaining the securement means in close proximity with the article supporting elements to prevent unauthorized removal of the article from the carrier assemblage. In the present embodiment of the invention, this first locking means comprises an elongated locking pin 36 (FIG. 3) which is telescopically receivable within indexable apertures 37 and 39 provided in first member 26 and second member 28a respectively. Also forming a part of the first locking means of the present invention is a padlock 42 having a shackle 42a which is closely receivable within an aperture 43 formed proximate the extremity of locking pin 36 (FIG. 3). With this construction, when member 28a is telescopically positioned within member 26 so that member 28b is in pressural engagement with the frame member 32 of the bicycle in the manner shown in FIG. 2, apertures 37 and 39 in members 26 and 28a will move into index so as to permit the insertion of locking pin 36. This inability to remove pin 36 will, of course, prevent upward movement of member 28a relative to member 26 and, in turn, will preclude the unauthorized removal of frame member 32 of the bicycle from the article carrier.

Figure 6:
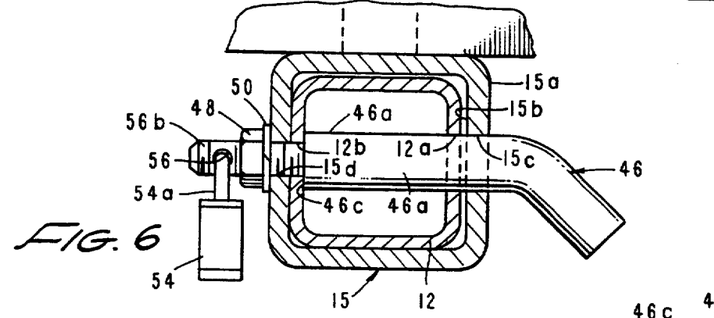
FIG. 6 is a cross-sectional view taken along lines 6—6 of FIG. 2.
Figure 7:
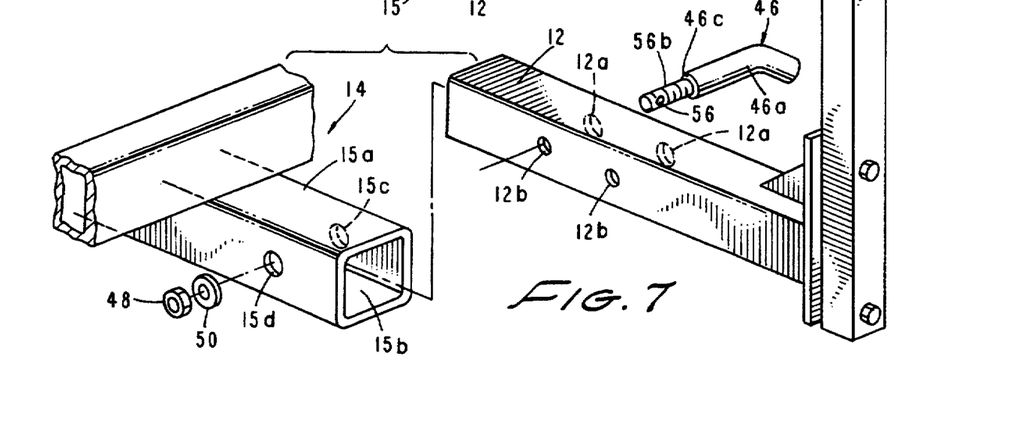
FIG. 7 is an enlarged, fragmentary exploded view of the lower portion of the improved article carrier of one form of the invention showing the manner in which the apparatus is interconnected with the square tube trailer hitch mounted at the rear of the passenger vehicle.
Figure 8:
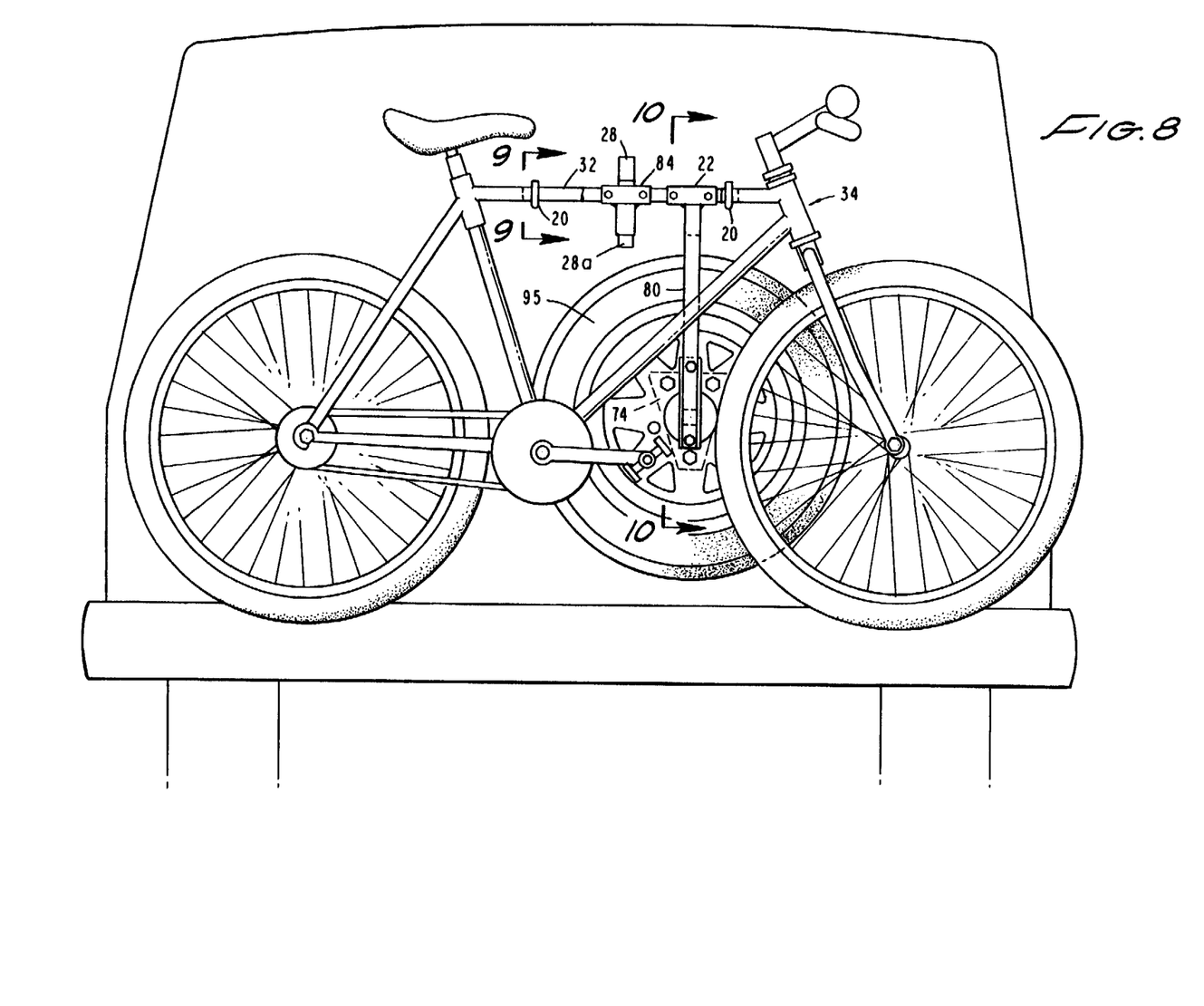
FIG. 8 is an enlarged front view of another form of the article carrier of the invention showing a bicycle removably mounted on the apparatus, which, in this case, is removably interconnected with the vehicle spare tire mounting assembly.

Referring particularly to FIGS. 2 and 6, the second clamping and locking means of the present invention is there illustrated. This means prevents disconnection of the connecting member 12 from the square tube trailer hitch assembly 14 and comprises connector means, here shown as an elongated rod-like member 46. Member 46 includes a first portion 46a which is closely receivable within first aperture 15c of hitch member 15 and within a selected first bore 12a provided in elongate connector member 12 of the interconnection means of the invention. Member 46 also includes a second threaded portion 46b which is of smaller diameter than portion 46a. A shoulder 46c is defined at the junction of portions 46a and 46b. As best seen in FIG. 6, portion 46b is closely receivable within a selected second bore 12b provided in elongate member 12 and also within second aperture 15d of hitch member 15. Aperture 12b and 15d are of smaller diameter than apertures 12a and 15c. A nut 48 and a washer 50 are receivable over threaded portion.

When member 46 is fully inserted in the manner shown in FIG. 6, shoulder 46c engages the inner wall of elongate member 12 so that, upon tightening nut 48, the external surface of elongate member 12 will be securely clamped against the inner surface of wall 15a of the hitch member thereby positively preventing relative movement between hitch member 15 and elongate connector member 12.

In prior art devices, which do not embody the important clamping feature described in the preceding paragraph, clearance between the connector member of the article carrier apparatus and the tubular hitch member promotes a highly undesirable vibratory movement of the carrier assembly. When prior art carrier devices are mounted on a trailer, this vibratory movement could become so severe that either the connector member or the hitch member would fracture causing catastrophic separation of the article carrier apparatus from the vehicle. When such separation occurred on the highway, the article being carried could be severely damaged or destroyed and a significant highway safety hazard could result. However, when the telescoping parts are securely and positively clamped together by the connector means of the present invention in the manner shown in FIG. 6, swinging or vibratory motion of the article carrier apparatus relative to the hitch is positively prevented. Accordingly, the carrier apparatus of the invention can safely be used with trailers or other vehicles which tend to impart even a substantial swinging or vibratory motion to the article carrier.

A second telescoping assembly of the invention is formed by stub tube 22 and support member 30 of the article supporting means of the carrier assemblage. Turning particularly to FIGS. 3 and 4, it is to be noted that elongate member 30 is provided with a plurality of spaced apart bores or apertures 57 which are of a smaller diameter than apertures 24 provided in stub tube 22. Bolts 60 function to securely and positively clamp together hollow tube 22 and elongated member 30. Each bolt 60 has a threaded shank portion 60a and a hexagonally shaped head portion 60b which is closely receivable within hexagonally shaped apertures 24. Shank portion 60a is closely receivable within apertures or bores 57 of elongate member 30 and is also closely receivable within second aperture 27 of stub tube 22. Head portion 60b of the bolts being larger than apertures 57 will engage the outer surface of elongate member 30 when the bolt is fully inserted into the telescoping assembly in the manner shown in FIG. 4. When nut 62 is then threadably connected to shank portion 60b and tightened down, head portion 60a will urge the outer surface of elongate member 30, which is opposite the head engaging surface, into secure clamping engagement with the inner surface of stub tube 22, thereby clamping members 22 and 30 together in a manner to positively prevent relative movement therebetween. With this construction, swinging movement of the article being carried is effectively dampened by the clamped together telescoping members 22 and 30.

Also forming a part of the second locking means of the invention is a second padlock 54 having a shackle 54a which is closely receivable within aperture 56 formed in threaded portion 46b of rod-like member 46 (FIG. 6). With this construction, when member 12 is telescopically positioned within hollow trailer hitch member 14 to form a telescoping assembly and the members are clamped together by member 46 and nut 48, shackle 54a of padlock 54 can be inserted into aperture 56 thereby preventing removal of member 46 from the assemblage. This inability to remove member 46 will, of course, prevent withdrawal of connector member 12 from hitch member 15 which, in turn, will prevent unauthorized removal of the article carrier from the trailer hitch which has been fixedly secured to the vehicle.

Figures 9, 10, 13:
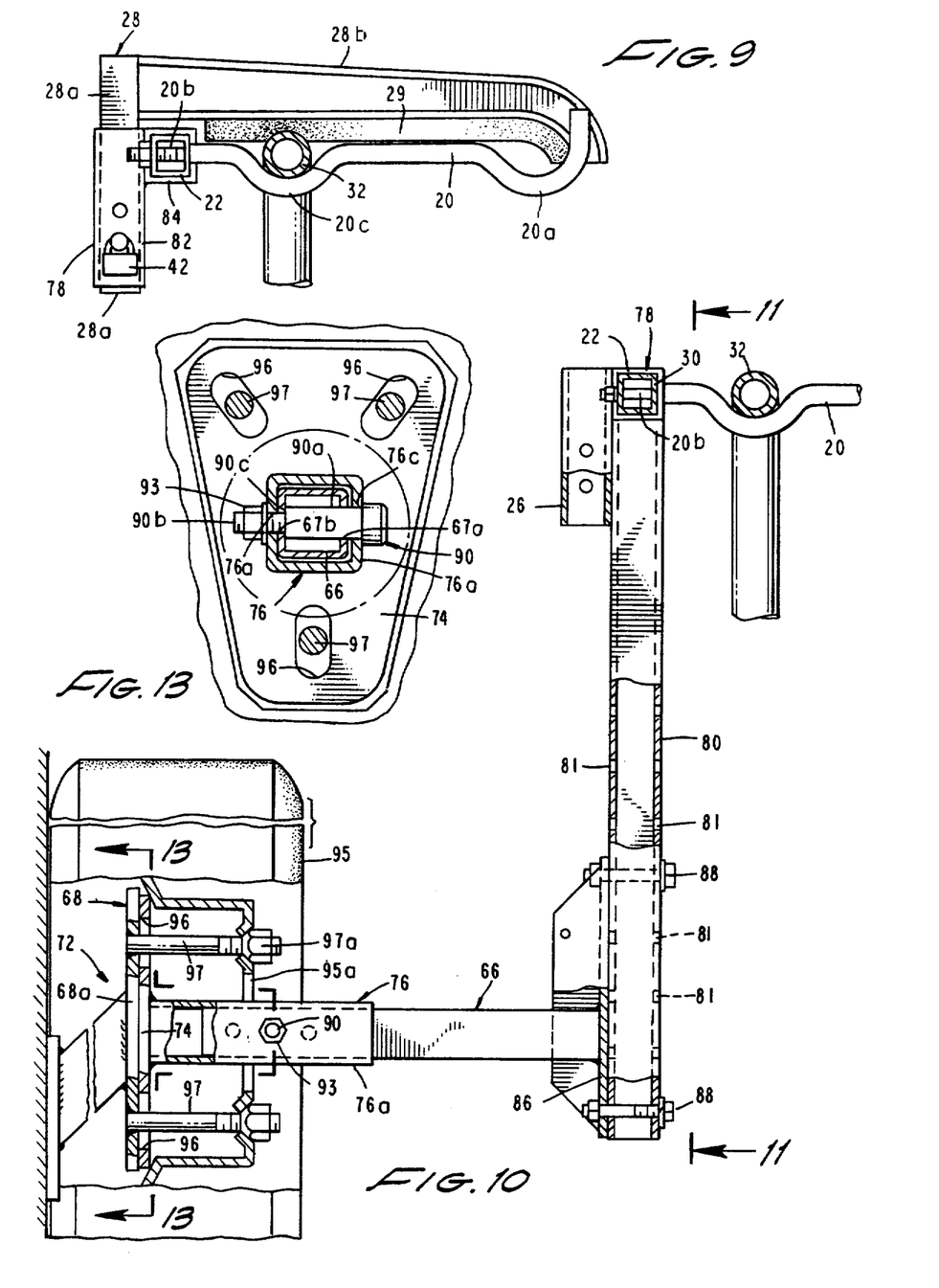
FIG. 9 is a cross-sectional view taken along lines 9—9 of FIG. 8.
FIG. 10 is a view partly in cross-section taken along lines 10—10 of FIG. 8.
FIG. 13 is a cross-sectional view taken along lines 13—13 of FIG. 10.

Turning now to FIGS. 8 through 14, another embodiment of the present invention is there shown. This embodiment is similar in many respects to the earlier described embodiment and like numerals are used to identify like components. More particularly, the apparatus of this second form of the invention comprises a lower elongate tubular connection member 66 (FIGS. 10 and 14) adapted to removably interconnected with interconnection means for interconnecting member 66 with a spare tire carrier or mounting assembly 68 of the vehicle. The interconnection means is here shown as a mounting assembly 72 which comprises a mounting plate 74 and an outwardly extending tubular member 76 having a wall 76a which is generally square in cross section and defines an external surface and an internal passageway 76b. Wall 76a is here shown as having a first aperture 76c of a first size and a second oppositely disposed aperture 76d of a second smaller size (FIG. 13).

Figures 11, 12, 14:
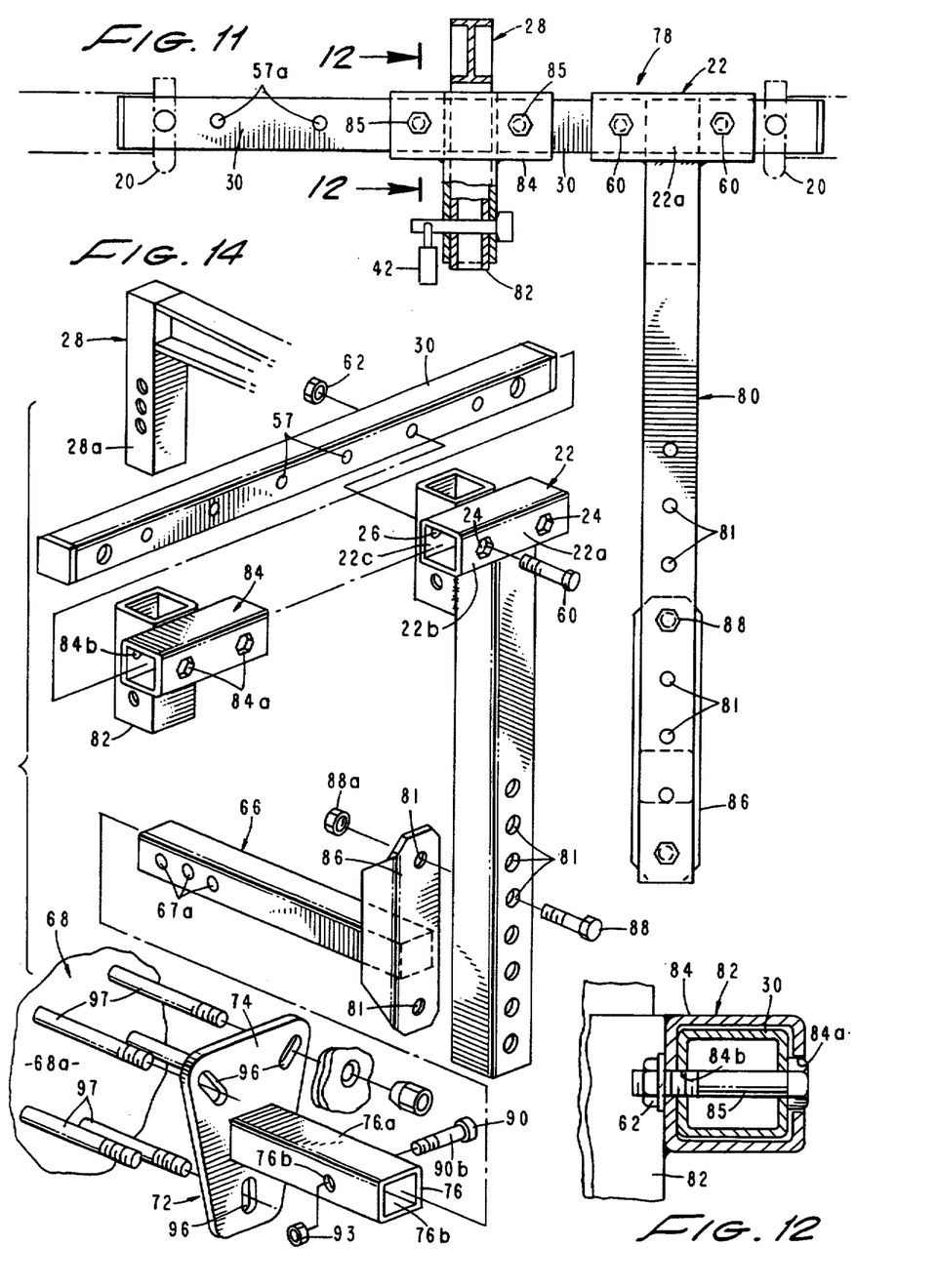
FIG. 11 is a view taken along lines 11—11 of FIG. 10.
FIG. 12 is a cross-sectional view taken along lines 12—12 of FIG. 1.
FIG. 14 is a generally perspective exploded view of the article carrier of this second form of the present invention.

Interconnected with the connecting member 66 is a carrier assemblage generally designated in FIG. 10 by the numeral 78. Assemblage 78 is adapted to carry an article such as a bicycle, wheelchair, or other velocipede in a secure manner at the rear of the vehicle. In the embodiment of the invention shown in FIGS. 8 through 14, the carrier assemblage 78 comprises a generally vertically extending tubular column 80 and a pair of outwardly extending article supporting first elements 20 for removably supporting the article to be carried. As best seen in FIGS. 11 and 14, a transversely extending hollow stub tube 22 is connected to column 80 by any suitable means, such as welding.

Hollow tube 22 comprises a part of the article supporting means of this second form of the invention for supporting the article to be carried and includes a wall 22a which is generally rectangular in cross-section. Wall 22a defines an exterior surface 22b and an internal passageway 22c (FIG. 14). A first pair of apertures 24 of a first size and shape, namely hexagonal, is provided in wall 22a. Aligned with apertures 24 is a second pair of oppositely disposed apertures 26 of a second smaller size (FIG. 12).

Referring particularly to FIGS. 11 and 14 of the drawings, the carrier assemblage can be seen to further comprise a generally horizontally extending member 30 which is telescopically receivable within stub tube 22. Member 30 functions to carry the previously identified spaced apart article supporting elements 20 in the manner illustrated in FIGS. 9 and 11. Each of members 20 is of identical construction to that previously described and functions to receive a frame member, such as a cross bar, 32 of a bicycle 34 which here comprises the carried article. It is to be understood that the article supporting first element could also be used to removably support frame members of other velocipedes.

Securement means of the character previously described cooperate with the article supporting elements 20 for preventing unauthorized removal of the carried article from the carrier assemblage. The securement means here comprises first and second slidably interconnected members 82 and 28 (FIG. 14). In the form of the invention shown in FIG. 14, first member 82 of the securement means comprises a vertically extending hollow tube which is connected to a second hollow stub member 84 by any suitable means such as welding. Stub member 84 is of similar construction to stub member 22 but is normally transversely spaced therefrom in the manner best seen in FIG. 11.

As in the earlier described form of the invention, second member 28 is generally "L" shaped, having a vertically extending member 28a which is telescopically receivable within tubular member 82 and a second outwardly extending member 28b which carries, along its lower surface a padding material 29, such as sponge rubber or the like. As before, portion 28b of second member 28 is adapted to be moved into close proximity with the article being carried to prevent unauthorized removal thereof from the article carrier. First locking means, including a padlock 42, is provided to prevent unauthorized removal of member 28.

Turning once again to FIG. 14, connector member 66 is affixed to plate 86, which is, in turn, adjustably connected to column 80 by fasteners such as a bolt 88 and a cooperating nut 88a. Plate 86 as well as column 80 are provided with indexably apertures 81 that permit members 66 to be connected to column 80 at various vertical locations. In this way, the height of the carrier assemblage can be adjusted so that the apparatus can be used both with full size and compact sport trucks and vans.

As indicated in FIGS. 10 and 13, elongated member 66 is telescopically receivable in tubular member 76 and is locked in place by connector means here provided as a member such a bolt 90. Bolt 90 includes a first portion 90a which is closely receivable within first aperture 76c of member 76 and within a selected first bore 67a provided in elongate connector member 66 of the interconnection means of the invention. With this construction, the spacing between the carrier assemblage and the rear of the vehicle can be conveniently adjusted. Bolt 90 also includes a second threaded portion 90b which is of smaller diameter than portion 90a. A shoulder 90c (FIG. 13) is defined at the junction of portions 90a and 90b.

As best seen in FIG. 13, portion 90b is closely receivable within a selected second bore 67b provided in elongate member 66 and also within a second aperture 76d of member 76. Apertures 67b and 76d are of smaller diameter than apertures 67a and 76c. A nut 93 is threadably connected to shank portion 90c. When member 90 is fully inserted in the manner shown in FIG. 13, shoulder 90c engages the inner wall of elongate member 66 so that upon tightening nut 93, the external surface of elongate member 66 will be securely clamped against the inner surface of wall 76a of tubular member 76 thereby positively preventing relative movement between member 76 and elongate connector member 66.

In using the apparatus of this second form of the invention, the vehicle spare tire 95 (FIG. 1) is first removed from the tire mounting assembly 68. Plate 74, is provided with apertures 96 which are indexable with the spare tire holding studs 97 (FIG. 14), so that the plate can be slipped over the studs and pressed into engagement with plate 68a of the spare tire mounting assembly in the manner shown in FIG. 10. The spare tire and rim is next repositioned over studs 97 and clamped down using lug nuts 97a. With the spare tire and rim in this position, tubular member 76, which is affixed to plate 74, protrudes through the central opening 95a in the spare tire rim.

With the plate and tubular member subassembly of the apparatus secured in portion in the manner shown in FIG. 10, connector member 66 can be telescopically mated with tubular member 76 and the selected apertures in the respective tubular members are aligned. This done, bolt 90 is inserted through apertures 76c, 67a, 67b and 76d (FIG. 10) With bolt 90 fully inserted, shoulder 90c will abut the inner surface of tubular member 66. Nut 93 is then threaded onto portion 90b and tightened down so as to securely clamp the exterior wall surface of member 66 against the inner wall surface of tubular member 76.

With the article carrier subassembly thusly connected to the vehicle spare tire mount, stub tube 22 can be interconnected with member 30 using bolts 60 in the manner discussed in connection with the earlier described embodiment. Next stub tube 84, which is provided with apertures 84a and 84b is slidably moved along member 30 to a position wherein the article to be carried will be centered with the rear of the vehicle. Bolts 85 are then inserted into appropriate apertures 57 and along with nuts 62 secure stub tube 84 in place in the manner shown in FIG. 12. As previously discussed, stub tubes 24 and 84 are uniquely apertured and bolts 60 and 85 are configured so that the exterior surface of member 30 will be tightly clamped against the interior surface of the stub tubes in a manner to positively prevent relative movement between elongate member 30 and the stub tubes 22 and 84. Apertures 57a are provided along the length of member 30 so that the article being carried can be easily centered relative to the rear of the vehicle.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An article carrier adapted to be detachably interconnected with a vehicle, comprising:
   (a) a tubular connecting member; (b) interconnection means for interconnecting said tubular connecting member with the vehicle whereby said member extends outwardly from the vehicle and is secured against both inward and outward movement relative to the vehicle as well as movement side ways with respect to the vehicle,
   (c) a column connected to said tubular connecting member and extending upwardly therefrom; and
   (d) article supporting means connected to said column for supporting the article to be carried, said article supporting means comprising:
      (i) a hollow tube connected to said column, said tube having a wall defining an external surface and an internal passageway, said wall having a first aperture of a first size and shape and a second, oppositely disposed aperture;
      (ii) an elongated support member telescopically receivable within said hollow tube, said support member being smaller in outside dimension than said internal passageway of said hollow tube, whereby said support member is movable transversely of said internal passageway, said support member having first and second bores said first bore being of a size smaller than said size of said first aperture in said hollow tube;
      (iii) a bolt having a head and a threaded shank, said threaded shank being receivable in said second aperture of said hollow tube and in first and second bores of said support member, said head of said bolt being non-rotatably receivable within said first aperture of said hollow tube and being movable into engagement with said hollow tube;
      (iv) a nut threadably receivable on said threaded shank of said bolt for urging said head of said bolt into pressural engagement with said support member, whereby said support member will be urged into pressural engagement with said hollow tube thereby preventing relative movement between said support member and said hollow tube; and
      (v) a first outwardly extending article supporting element connected to said support member.

2. An article carrier as defined in claim 1 in which said interconnection means comprises:
   (a) a tubular member securely affixed to the vehicle having a wall defining an external surface and an internal passageway, said wall having a first aperture of a first size and a second, oppositely disposed aperture of a second smaller size, said tubular connecting member being an elongate member telescopically receivable within said tubular member, and having a first bore of a size approximating said size of said first aperture in said tubular member and a second bore in axial alignment with said first bore, said second bore being of a size approximately equal to said size of said second aperture in said wall of said tubular member; and
   (b) connector means for interconnecting said tubular member with said tubular connecting member said connector means comprising a rod like member having:
      (i) a first portion receivable within said first aperture of said tubular member and within said first bore of said tubular connecting member;
      (ii) a second threaded portion contiguous with but smaller than said first portion, said second threaded portion being receivable within said second bore in said tubular connecting member and being receivable within and extending through said second aperture of said tubular member;
      (iii) a shoulder located at the junction of said first and second portion; and
      (iv) a nut threadably receivable over said second threaded portion for engagement with said external surface of said tubular connecting member for urging said shoulder into pressural engagement with said tubular connecting member whereby said tubular connecting member is urged into pressural engagement with said tubular member thereby preventing relative movement between said tubular connecting member and said tubular member.

3. An article carrier as defined in claim 2 in which said interconnection means further comprises a base plate adapted to be interconnected to said vehicle, said tubular member of said interconnection means being connected to said base plate.

4. An article carrier as defined in claim 2, further including a second outwardly extending article supporting element connected to said support member.

5. An article carrier as defined in claim 4 further including securement means connected to said column for cooperative interaction with said article supporting elements for preventing removal of an article from the article carrier.

6. An article carrier as defined in claim 5 in which said securement means comprises first and second slidably interconnected members said first member being connected to said column and said second member comprising an outwardly extending clamping arm adapted to be moved into close proximity with the article to prevent removal thereof from the article carrier.

7. An article carrier for detachable interconnection with a vehicle comprising:
   (a) an elongated hollow tube extending outwardly from the vehicle and having a wall defining an external surface and an internal passageway, said wall having a first aperture of a first size and a second, oppositely disposed aperture of a second size;
   (b) vehicle connection means for connecting said elongated hollow tube to the vehicle;

(c) an elongate member telescopically receivable within said elongated hollow tube, said member extending outwardly from the vehicle and being smaller in outside dimension than said internal passageway of said elongated hollow tube, said elongate member having a first bore of a size approximating said size of said first aperture in said elongated hollow tube and a second bore in axial alignment with said first bore, said second bore being of a smaller size approximately equal to said size of said second aperture in said wall of said elongated hollow tube; and (d) connector means for interconnecting said elongated hollow tube and said elongate member, said connector means comprising:

(i) a first portion receivable within said first aperture of said elongated hollow tube and within said first bore of said elongate member;

(ii) a second threaded portion contiguous with but smaller than said first portion, said second threaded portion being receivable within said second bore in said elongate member and being receivable within and extending through said second aperture of said elongated hollow tube;

(iii) a shoulder located at the junction of said first and second portion;

(iv) a nut threadably receivable over said second threaded portion for engagement with said external surface of said elongated hollow tube for urging said shoulder into pressural engagement with said elongate member, whereby said elongate member is urged into pressural engagement with said elongated hollow tube; and (e) a carrier assemblage connected to said elongate member, comprising:

(i) a column extending upwardly from said elongate member;

(ii) a pair of outwardly extending article supporting elements connected to said upwardly extending column for supporting the article to be carried; and   (iii) means for connecting said article support elements to said upwardly extending column.

8. An article carrier as defined in claim 7 in which said means for connecting said article supporting elements to said column comprises:

(a) a hollow tube connected to said column, said tube having a wall defining an external surface and an internal passageway, said wall having a first aperture of a first size and shape and a second, oppositely disposed aperture of a second smaller size;

(b) an elongated member telescopically receivable within said hollow stub tube, said member being smaller in outside dimension than said internal passageway of said hollow stub tube said elongated member having first and second bores said first bore being of a size smaller than said size of said first aperture in said hollow stub tube;

(c) a bolt having a head and a threaded shank, said threaded shank being receivable in said second aperture of said hollow stub tube and in first and second bores of said elongated member, said head of said bolt being non-rotatably receivable within said first aperture of said hollow tube and being movable into engagement with said hollow stub tube;

(d) a nut threadably receivable on said threaded shank of said bolt; and (e) a first outwardly extending article supporting element connected to said elongated member.

9. A telescoping assembly comprising:

(a) an elongated hollow tube having a wall defining an external surface and an internal passageway, said wall having a first aperture of a first size and a second, oppositely disposed aperture of a second size;

(b) an elongate member telescopically receivable within said elongated hollow tube, said member being smaller in outside dimension than said internal passageway of said elongated hollow tube, whereby said elongate member is movable transversely of said internal passageway, said elongate member having a first bore of a size approximating said size of said first aperture in said elongate hollow tube and a second bore in axial alignment with said first bore, said second bore being of a smaller size approximately equal to said size of said second aperture of said wall of said elongate hollow tube; and (c) connector means for interconnecting said elongate hollow tube and said elongate member, said connector means comprising:

(i) a first portion receivable within said first aperture of said elongate hollow tube and within said first bore of said elongate member;

(ii) a second threaded portion contiguous with but smaller than said first portion, said second threaded portion being receivable within said second bore in said elongate member and being receivable within and extending through said second aperture of said elongate hollow tube;

(iii) a shoulder located at the junction of said first and second portion; and   (iv) a nut threadably receivable over said second threaded portion for engagement with said external surface of said elongated hollow tube for urging said shoulder into pressural engagement with said elongate member, whereby said elongate member is urged into pressural engagement with said elongated hollow tube.

10. An article carrier for detachable interconnection with a vehicle of the character having a spare tire mount which includes a plurality of threaded studs receivable within circumferentially spaced apertures provided in the spare tire rim, said article carrier comprising:

(a) a first elongated member comprising an elongate hollow tube having a wall defining an external surface, said wall having a first aperture of a first size and a second, oppositely disposed aperture of a second size;

(b) vehicle connection means for connecting said first elongated member to the spare tire mount of the vehicle;

(c) a second elongated member connected to said first elongated member and extending outwardly from the spare tire mount, said second elongated member comprising a tubular member telescopically receivable within said elongate hollow tube, said tubular member being provided with a first bore of a size approximating said size of said first aperture of said elongate hollow tube and a second bore in axial alignment with said first bore, said second bore being of a smaller size approximately equal to said size of said second aperture in said wall of said tubular member;

(d) connector means for interconnecting said elongate hollow tube with said tubular member, said connector means comprising a rod like member having;
  (i) a first portion receivable within said first aperture of said elongate hollow tube and within said first bore of said tubular member;
  (ii) a second threaded portion contiguous with but smaller than said first portion, said second threaded portion being receivable within said second bore in said tubular member and being receivable within said extending through said second aperture of said elongate hollow tube;
  (iii) a shoulder located at the junction of said first and second portion; and
  (iv) a nut threadably receivable over said second threaded portion for engagement with said external surface of said tubular member for urging said shoulder into pressural engagement with said tubular member whereby said tubular member is urged into pressural engagement with said elongate hollow tube; and
(e) a carrier assemblage connected to said second elongated member for removably carrying an article.

11. An article carrier as defined in claim 10 in which said carrier assemblage comprises:
  (a) a column extending upwardly relative to said second elongated member;
  (b) at least one outwardly extending article supporting element connected to said column for supporting an article to be carried; and
  (c) means for connecting said article support element to said column.

12. An article carrier for detachable interconnection with a vehicle comprising:
  (a) an elongated hollow tube extending outwardly from the vehicle and having a wall defining an external surface and an internal passageway, said wall having a first and second oppositely disposed apertures;
  (b) vehicle connection means for connecting said elongated hollow tube to the vehicle;
  (c) an elongate member telescopically receivable within said elongated hollow tube, said member extending outwardly from the vehicle and being smaller in outside dimension than said internal passageway of said elongated hollow tube, said elongate member having a first bore of a size approximating said size of said first aperture in said elongated hollow tube and a second bore in axial alignment with said first bore; and
  (d) connector means for interconnecting said elongated hollow tube and said elongate member, said connector means comprising:
    (i) a first portion receivable within said first aperture of said elongated hollow tube and within said first bore of said elongate member;
    (ii) an elongated hollow tube engaging portion located proximate said first portion; and
    (iii) a second threaded portion rotatably receivable within said second bore in said elongate member for urging said elongated hollow tube engaging portion into pressural engagement with said external surface of said elongated hollow tube, whereby said elongate member is urged into pressural engagement with said elongated hollow tube.

13. An article carrier as defined in claim 12 in which said connector means further comprises a portion extending through said second aperture of said elongated hollow tube.

14. A telescoping assembly comprising:
  (a) an elongated hollow tube having a wall defining an external surface and an internal passageway, said wall having a first and second oppositely disposed apertures;
  (b) a member telescopically receivable within said elongated hollow tube, said member being smaller in outside dimension than said internal passageway of said elongated hollow tube, whereby said member is movable transversely of said internal passageway, said member having a bore of a size approximating said size of said first aperture in said elongate hollow tube and a second bore in axial alignment with said first bore; and
  (c) connector means for interconnecting said elongate hollow tube and said member, said connector means comprising:
    (i) a first portion receivable within said first aperture of said elongate hollow tube and within said first bore of said member;
    (ii) an elongated hollow tube engaging portion located proximate said first portion; and
    (iii) a second threaded portion contiguous with said first portion, said second threaded portion being rotatably receivable within said second bore in said member for urging said elongated hollow tube engaging portion into pressural engagement with said extended surface of said, elongated hollow tube, whereby said member is urged into pressural engagement with said elongated hollow tube.

15. A telescoping assembly as defined in claim 14 in which said connector means further comprises a portion extending through said second aperture of said elongated hollow tube.

* * * * *